(12) United States Patent
Bosaglia et al.

(10) Patent No.: US 12,070,716 B2
(45) Date of Patent: Aug. 27, 2024

(54) PROCESS AND DEVICE FOR SAMPLING THE HEADSPACE (71) Applicant: THERMO FISHER SCIENTIFIC SPA, Rodano (IT)

(72) Inventors: Tiziano Bosaglia, Rodano (IT); Stefano Pelagatti, Rodano (IT); Riccardo Facchetti, Rodano (IT)

(73) Assignee: THERMO FISHER SCIENTIFIC S.P.A., Rodano (IT)

( * ) Notice: Subject to any disclaimer, the term of this patent is extended or adjusted under 35 U.S.C. 154(b) by 974 days.

(21) Appl. No.: 16/385,404

(22) Filed: Apr. 16, 2019

(65) Prior Publication Data
US 2019/0321771 A1 Oct. 24, 2019

(30) Foreign Application Priority Data
Apr. 24, 2018 (IT) .................. 102018000004825

(51) Int. Cl.
B01D 53/02 (2006.01)
G01N 1/22 (2006.01)
G01N 30/02 (2006.01)

(52) U.S. Cl.
CPC ......... *B01D 53/025* (2013.01); *G01N 1/2226* (2013.01); *G01N 30/02* (2013.01); *G01N 2001/2229* (2013.01)

(58) Field of Classification Search
CPC ............ B01D 19/0021; B01D 19/0026; B01D 53/025; B01D 53/24; G01N 1/2226; G01N 30/02; G01N 2001/2229; G01N 2001/2232; G01N 2035/00495; G01N 2035/00504; B04B 1/00; B04B 1/02; B04B 5/02; B04B 5/0414; B04B 5/08
See application file for complete search history.

(56) References Cited

U.S. PATENT DOCUMENTS

| 4,237,733 A | 12/1980 | Boege et al. |
| 5,453,380 A | 9/1995 | Poole et al. |
| 5,792,423 A | 8/1998 | Markelov |

(Continued)

FOREIGN PATENT DOCUMENTS

| JP | 2014219200 | 11/2014 | |
| JP | 2014219200 A | * 11/2014 | ............... G01N 1/22 |

OTHER PUBLICATIONS

Search report and written opinion issued on Jan. 15, 2019 for Italian priority application No. IT 102018000004825.

*Primary Examiner* — Justin N Olamit (57) ABSTRACT

Process for sampling the headspace, comprising the steps of: (i) preparing a container (1) containing a substance in the liquid phase (2), a substance in the gaseous phase (3), a substance to be analyzed (4) initially at least partially contained in the substance in the liquid phase (2), wherein the substance in the liquid phase (2) has a contact surface (S) contacting the substance in the gaseous phase; (ii) constraining said container (1) to a supporting element (10) rotatable around a rotation axis (A1); (iii) rotating said supporting element (10) at such an angular velocity to tilt said contact surface (S) by an angle (α) of at least 20 degrees with respect to a plane (H) parallel to the bearing surface of the supporting element (10); (iv) stopping the rotation of said supporting element (10); (v) collecting a sample of the substance to be analyzed, in the gaseous phase.

17 Claims, 9 Drawing Sheets (56) References Cited

U.S. PATENT DOCUMENTS

| | | | |
|---|---|---|---|
| 6,180,060 B1 | 1/2001 | Green et al. | |
| 8,806,965 B2 * | 8/2014 | Sato | G01N 1/2226 |
| | | | 73/863.11 |
| 9,371,889 B2 * | 6/2016 | Vester | F16H 1/32 |
| 10,156,555 B2 * | 12/2018 | Falkenstein | G01N 1/2226 |
| 2011/0239792 A1 | 10/2011 | Sato et al. | |
| 2013/0035223 A1 | 2/2013 | Reymond et al. | |
| 2016/0368003 A1 | 12/2016 | Vester et al. | |

* cited by examiner

PROCESS AND DEVICE FOR SAMPLING THE HEADSPACE

This application claims priority to and the benefit of Italian Application No. 102018000004825 filed Apr. 24, 2018 the content of which is incorporated herein by reference in its entirety.

This invention refers to materials analysis. Specifically, this invention concerns a process and device for sampling the headspace, a technique that is typically used for the analysis of liquid or solid samples by the coupling with a gas chromatograph or similar analytical instrument.

Gas chromatography, as known, is an advantageous method for determining the components of a mixture. In order to carry out a gas chromatographic analysis, a sample of the mixture to be analyzed must be volatilized and introduced into a gas chromatographic column where its different components separate and reach the outlet at different times. The various separate components are then detected through one or more of their chemical or physical properties.

The headspace sampling technique is a technique that involves the analysis of a vapor, generated by a solid or liquid sample, in a closed container. In other words, a closed container or vial is partially filled with a liquid or solid sample; above the sample, i.e. in the so-called "headspace", vapors develop and are then collected to be analyzed. As a result of the temperature and, in the case of liquid samples, the shaking, the substances to be analyzed are "moved" to the gaseous phase and then collected by special means, such as a needle inserted into the vial through a septum.

Preferably, in order to increase the sensitivity of the gas chromatographic analysis, the substances to be analyzed should be highly concentrated in the headspace, i.e. the transition from the liquid phase to the head space must be maximized; it is also particularly advantageous to minimize the time required to carry out this operation.

In the known technique applied to liquid samples, vials are heated and shaken so as to promote and accelerate the accumulation of the substance to be analyzed in the headspace until thermodynamic equilibrium is reached, i.e. at the point where the substances split into the two phases (liquid and gaseous) and maintain stable concentrations over time.

Depending on the substances to be analyzed, it may take a long time, even several tens of minutes of heating and shaking, before equilibrium is reached and the headspace to be analyzed can be collected. The known solutions provide that the vial containing the sample is shaken, typically in a cycloidal, or tilting, or alternating way, with the aim of speeding up the transfer of the substance to be analyzed from the liquid phase to the gaseous phase. Although these solutions allow a certain reduction in waiting times, they have not proved to be entirely satisfactory.

Object of the present invention is therefore to provide a more efficient process for sampling the headspace with respect to what is known.

A particular object of this invention is to provide a process for sampling the headspace, able to reduce the time required for this process, in particular by reducing the time needed to transfer the substance to be analyzed from the liquid phase to the headspace, or gaseous phase.

These and other objects are solved by embodiments according to one or more of the appended claims.

In particular, object of the present invention is a process for sampling the headspace according to the appended claim 1. Preferred aspects are set forth in dependent claims.

According to an embodiment of the present invention, a process for sampling the headspace comprises the following steps:
(i) preparing a container containing a substance in the liquid phase, a substance in the gaseous phase, a substance to be analyzed initially at least partially contained in the substance in the liquid phase, wherein the substance in the liquid phase has a contact surface contacting the substance in the gaseous phase;
(ii) constraining said container to a supporting element rotatable around a rotation axis;
(iii) rotating said supporting element at such an angular velocity to tilt said contact surface by an angle greater than 20 degrees with respect to the bearing surface of the supporting element;
(iv) stopping the rotation of said supporting element;
(v) collecting a sample of the substance in the gaseous phase, containing the substance to be analyzed.

The volatilization of the substance to be analyzed, i.e. the transfer thereof into the "headspace" of the vial, in the gaseous phase, as well as the achievement of equilibrium are promoted by the rotation of the container.

First of all, the contact surface between the liquid phase and the gaseous phase, i.e. the surface that delimits the boundary between the substance in the liquid phase and the substance in the gaseous phase, increases its size as the tilt between said contact surface and the horizontal plane increases. As a result, the exchange surface between the substance in the liquid phase and the substance in the gaseous phase increases, thus facilitating the transition of the substance to be analyzed from the substance in the liquid phase to the headspace.

Moreover, by stopping the rotation of the aforesaid supporting element, the liquid, by inertia, acquires a rotational motion inside the vial. This results in a vortex, or in any case turbulent, motion within the liquid, which allows the temperature of the liquid to be equalized and a larger amount of sample to be brought to the contact surface. In fact, during the rotation of the supporting element, the transition of the sample from the liquid phase to the gaseous phase takes place, so that the area of the liquid at the contact surface is impoverished of the sample. In other words, the concentration of the sample tends to decrease near the contact surface, thereby causing a progressive decrease in the amount of sample transitioning from the liquid phase to the gaseous phase. The vortex or turbulent motion formed when the supporting element is stopped causes the liquid to be mixed, thus allowing the sample that is deep in the liquid to reach the contact surface and facilitating its transition to the gaseous phase. According to an embodiment of the invention, in step (ii), the container is constrained to the supporting element so that said rotation axis does not cross the supporting element. In other words, the container is placed at a distance from the rotation axis of the supporting element. As the distance between the container and the rotation axis increases, the tangential velocity of the container increases. The higher the tangential velocity of the container, the greater the tilt given to the contact surface.

Preferably, the longitudinal axis of the container is placed at a distance from the rotation axis of the supporting element higher than 2 cm, preferably higher than 3 cm, more preferably higher than 4 cm.

According to an embodiment of the present invention, in said step (iii), the movement direction is reversed at least once. As a result, the shaking of the liquid increases, thereby promoting the volatilization of the substance to be analyzed.

According to a possible embodiment, in the rotation step (iii), the supporting element is rotated for at least 1 second. In other words, the supporting element is kept rotating for more than 1 second. Typically, the supporting element is rotated by at least one complete revolution during its rotation, more preferably at least two complete revolutions, and even more preferably at least five complete revolutions.

According to an embodiment, the contact surface is tilted by at least 30 degrees, more preferably by at least 45 degrees, even more preferably by an angle that maximizes the liquid-gas contact surface, without the contact surface touching the cap of the vial or the bottom of the container.

According to an embodiment of the present invention, in said step (iv), the rotation is stopped. As a result, a vortex, caused by the inertia accumulated by the liquid during the rotation, is created in the liquid phase and favors the mixing thereof. In other words, the formation of the vortex in the liquid phase due to the stop of rotation favors the mixing in the liquid of the substance to be analyzed and allows said substance to be analyzed to reach the liquid-gas contact surface more quickly.

The present invention further concerns a device for sampling the headspace, comprising a supporting element rotatable around a rotation axis, provided with at least one seat to accommodate a container so that, in use, said rotation axis does not cross said supporting element.

Preferably, the device is configured so that in use the longitudinal axis of the container is placed at a distance from the rotation axis of the supporting element higher than 2 cm, preferably higher than 3 cm, more preferably higher than 4 cm.

Hereinafter, referring to the appended figures, exemplary and non-limiting embodiments of the present invention will be described, wherein.

Referring to the figures, a device 200 comprises a supporting element 10 configured to accommodate one or more containers (or vials) 1 for sampling the headspace.

Figure 2:
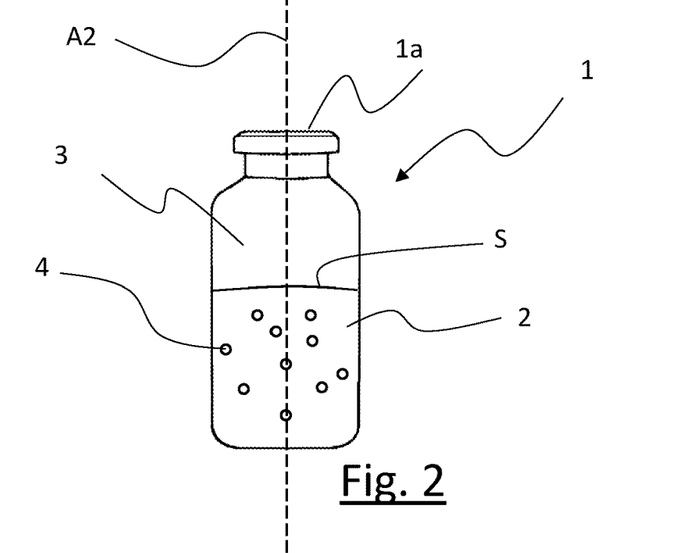
FIG. 2 is a schematic front view of a container or vial for sampling the headspace.

The container 1 is configured in a known way to contain a substance to be analyzed by a special instrument, typically a gas chromatograph, not shown in detail. Briefly, according to the known art, the container 1 is provided with a substance in liquid phase (hereinafter also "liquid") 2 that only partially fills container 1. Above the liquid 2 there is a substance in the gaseous phase (hereinafter also "gas") 3, so that the liquid 2 and the gas 3 are in contact with one another at a contact surface S, which corresponds to the free surface of the liquid 2. At least initially, the liquid 2 contains a substance to be analyzed (hereinafter also referred to as 'sample') 4. Various options, known in the art, are possible. The liquid 2 may be composed entirely of the sample 4, or the liquid 2 may be a solution containing the sample 4. Similarly, the gas 3 may be the gaseous phase of the liquid 2, but generally contains additional gases, such as for example inert gases. Once the sample 4 has been at least partially volatilized, the gaseous phase of the sample 4 will become part of the gas 3 located above the liquid 2.

In general, the liquid 2 comprises (or consists of) the sample to be analyzed, which must be volatilized before being able to be collected from container 1. In fact, when sampling the headspace, only the content of the gas 3 is analyzed, which is collected by special means, for example a syringe passing through the cap 1a of the container 1. The higher the concentration of the sample 4 in the gas 3, the better the results of the subsequent analyses.

Figure 1:
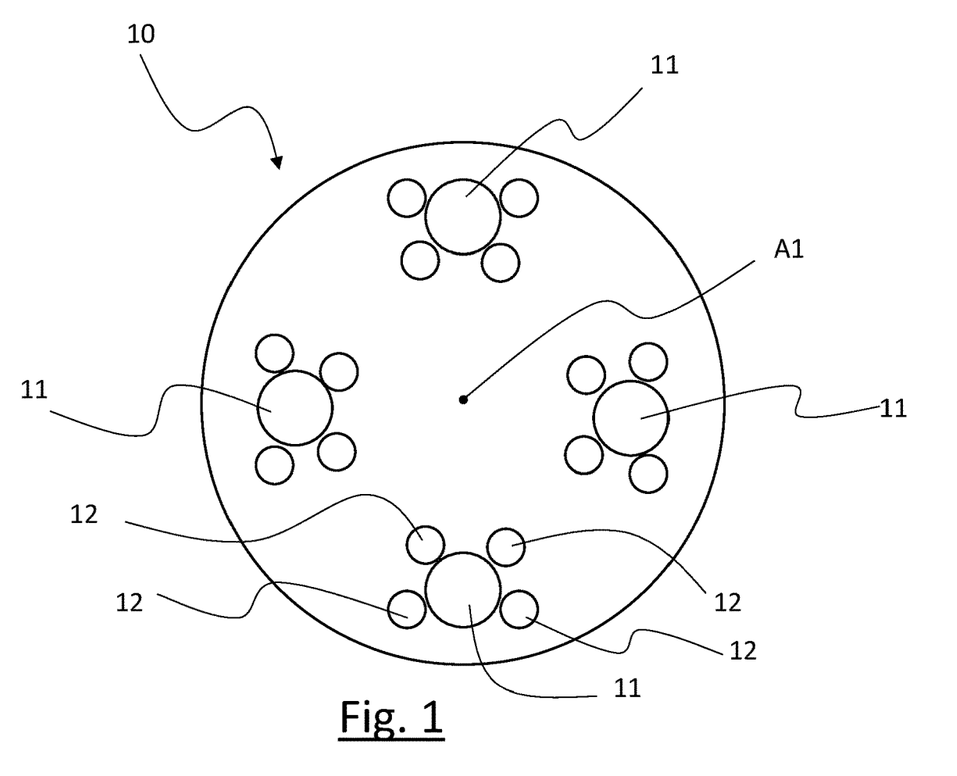
FIG. 1 is a schematic plan view of a possible supporting element to carry out a sampling of the headspace by means of an embodiment of a process according to the present invention.

The supporting element 10 has at least one seat 11 to accommodate a container 1. The seat 11 is typically configured as a cavity, and the container 1 can be partially inserted therein, preferably with limited clearance. According to a possible aspect, the seat 11 is at least partially closed at the bottom, so that, in use, the container 1 is supported by the seat 11 and partially inserted therein. The shape of the supporting element 10 can vary between different embodiments. In the embodiment shown, the supporting element 10 has circular section and limited height, i.e. it is shaped as a rotating drum.

The supporting element 10 can be rotated around a rotation axis A1. This solution is obtained in a manner known in the art, for example by an electric motor M suitably connected to the supporting element 10. The supporting element is preferably rotated at angular velocities exceeding 2 revolutions per second.

The device 200 is typically configured so that, in use, the rotation axis A1 is substantially vertical.

The seat 11 is placed at a distance from the rotation axis A1, i.e. the rotation axis A1 does not cross the seat 11. In other words, when the container 1, in use, is inserted into the seat 11, the axis A1 does not cross the container 1.

Figure 4:
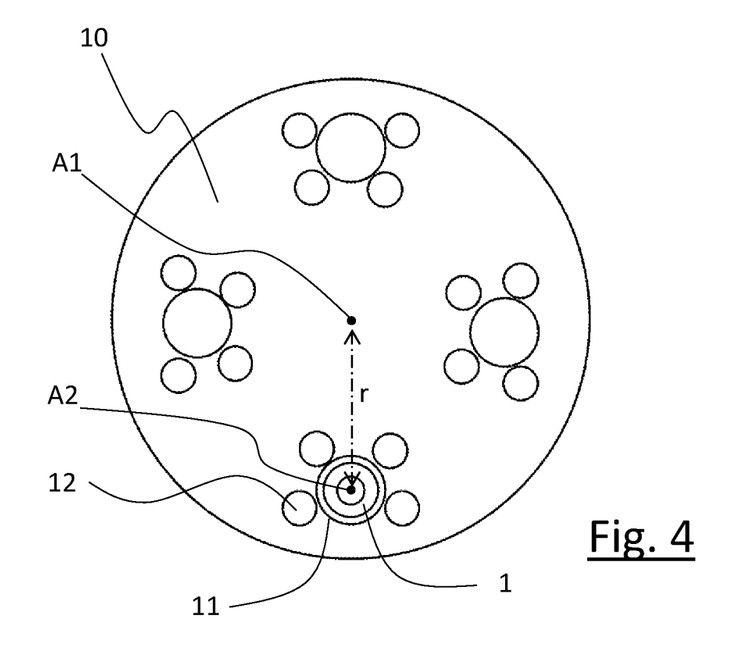
FIG. 4 is a plan view of FIG. 3.
Figure 5:
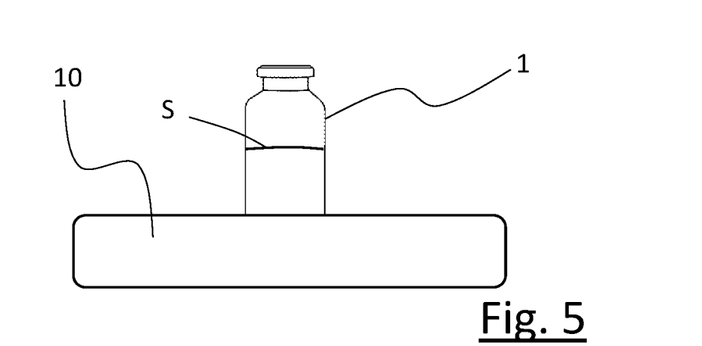
FIG. 5 is a simplified view of FIG. 3, wherein part of the elements has been omitted in order to highlight the behavior of the liquid inside the container.
Figure 6:
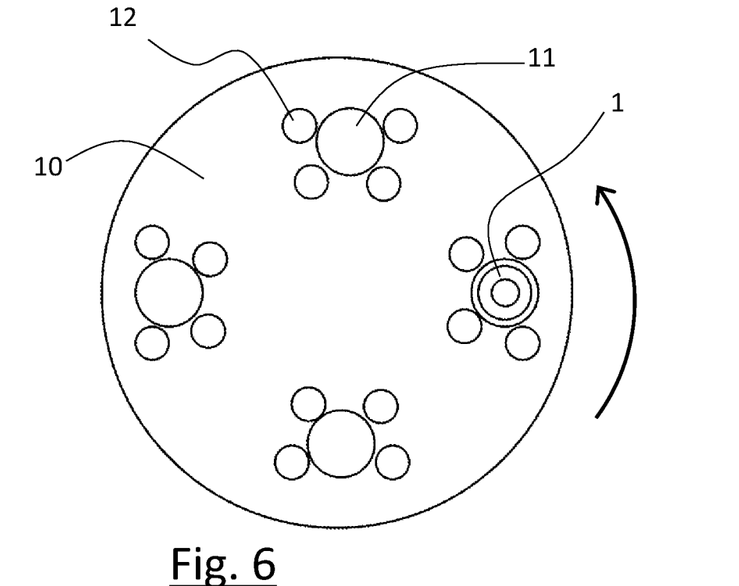
FIG. 6 is a plan view similar to FIG. 4, wherein the supporting element has begun its rotation.

Preferably, considering the longitudinal axis A2 of the container 1, in use, the distance r between the two axes A1, A2 is higher than 2 cm, more preferably higher than 3 cm, even more preferably higher than 4 cm.

Figure 3:
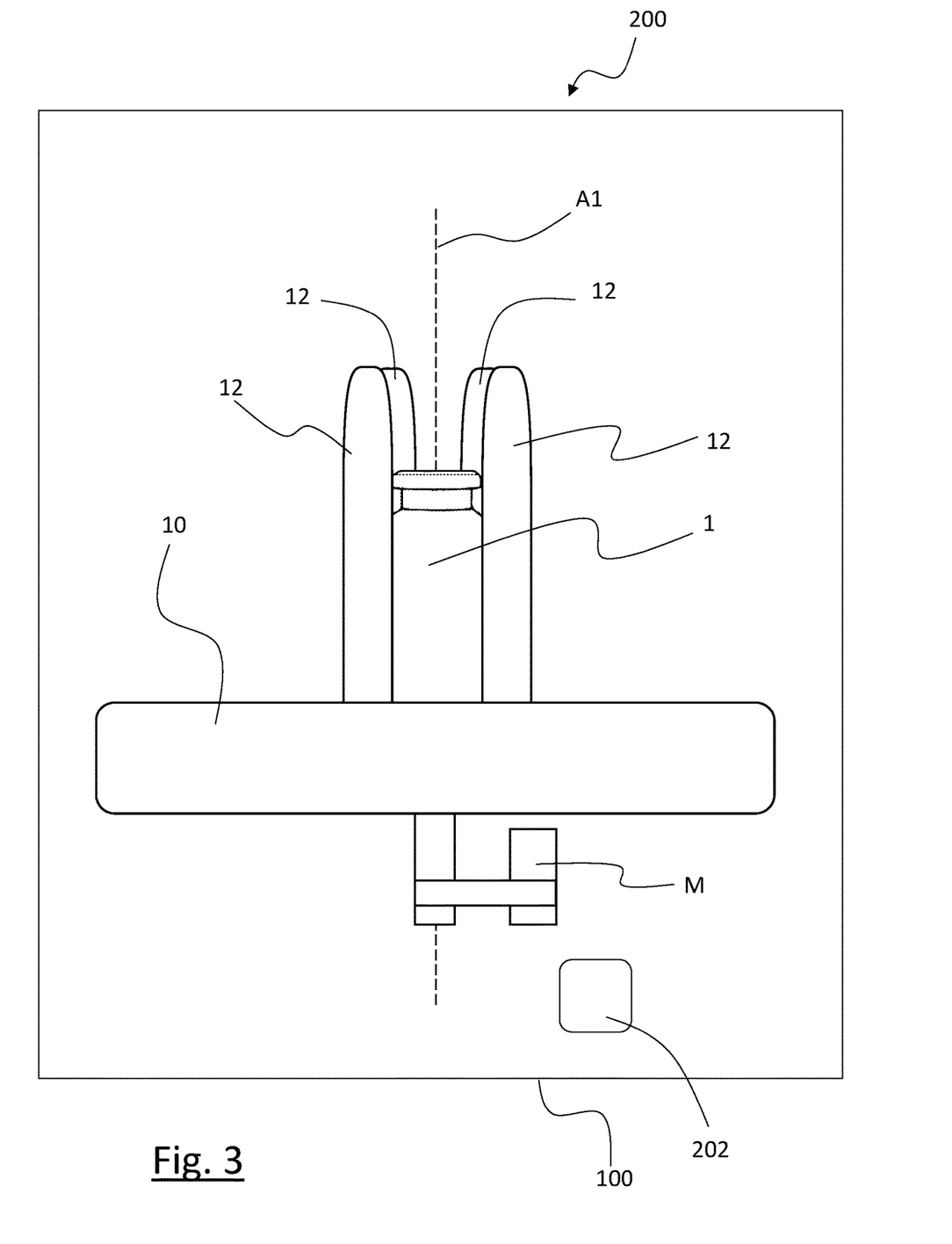
FIG. 3 is a schematic front view of the container of FIG. 2 constrained to the supporting element of FIG. 1.

Typically, when the container 1 is received by the seat 11, the two axes A1, A2 are substantially parallel to one another. In general, these axes A1, A2 are substantially perpendicular to a plane H parallel to the surface on which, in use, the supporting element is arranged, or parallel to the horizontal line.

At the seat 11, there may be protrusions 12 adapted to prevent or limit the tilt of the container during the rotation of the supporting element 10. These protrusions 12 are typically arranged around the seat 11, and their main extension direction is substantially parallel to the rotation axis A1. In the embodiment shown, the protrusions 12 have circular section; preferably the diameter of the protrusions is smaller (at most equal) than the diameter of the seat 11, while the height of the protrusions 12 is greater than the diameter of the section of the protrusions 12. Typically the height of the protrusions 12 is greater than the height of a standard container for sampling the headspace.

The supporting element 10 is preferably housed in an incubator or oven 100, or in any case a heated housing known in the art and schematically shown in FIG. 3, so that, in use, the container housed inside the supporting element can be heated to an appropriate temperature between 20 and 300 degrees, selected according to the type of sample to be analyzed.

In use, a container 1 is constrained (even by simple leaning) to the supporting element 10. Then, as shown in FIGS. 6-9, the supporting element 10 is rotated. The rotation speed (due to centrifugal force) pushes the liquid 2 towards the side surface of the container 1, so as to tilt the contact surface S.

Figure 7:
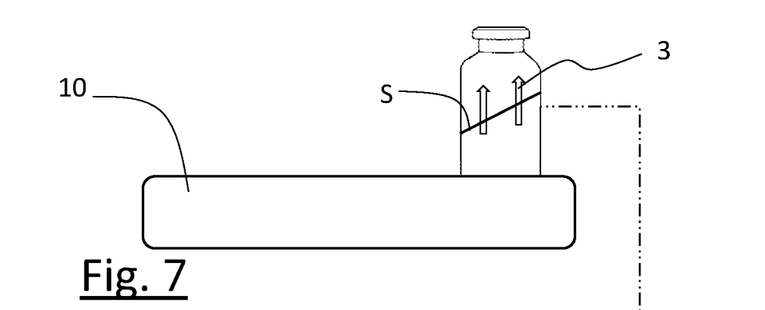
FIG. 7 is a schematic front view of FIG. 6, wherein part of the elements has been omitted.
Figure 7A:
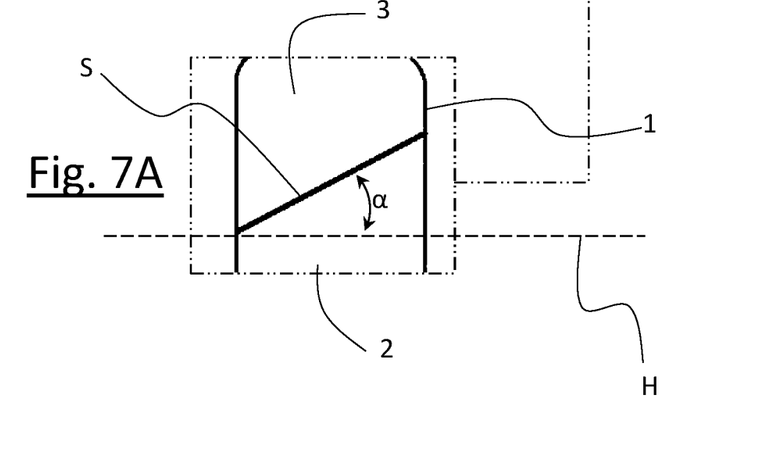
FIG. 7A is an enlarged detail of FIG. 7.

The contact surface S, with respect to the plane H (i.e. a plane parallel to the bearing surface of the support 10—or the device 200—or else parallel to the horizontal line, or in any case parallel to a plane tangent to the contact surface S in the rest condition of the supporting element 10), has a tilt a higher than 30 degrees, more preferably higher than 45 degrees, even more preferably higher than 60 degrees, or in any case an angle that maximizes the size of the liquid-gas contact surface S, i. e. typically without the contact surface S touching either the cap or a container narrowing, or the bottom of the container 1.

By touching the bottom of the container 1, drops of liquid phase may be generated which, when projected onto the cap 1*a*, may contaminate the needle at the time of collection. By touching the cap 1*a*, the cap material may contaminate the liquid, and thus the results of subsequent sample analysis may be corrupted.

A possible method to determine the rotation speed of the supporting element 1 that allows the maximum angle (i.e. the maximum tilt of the contact surface S, without the latter touching the cap 1*a* or the bottom of container 1) is as follows.

Figure 15:
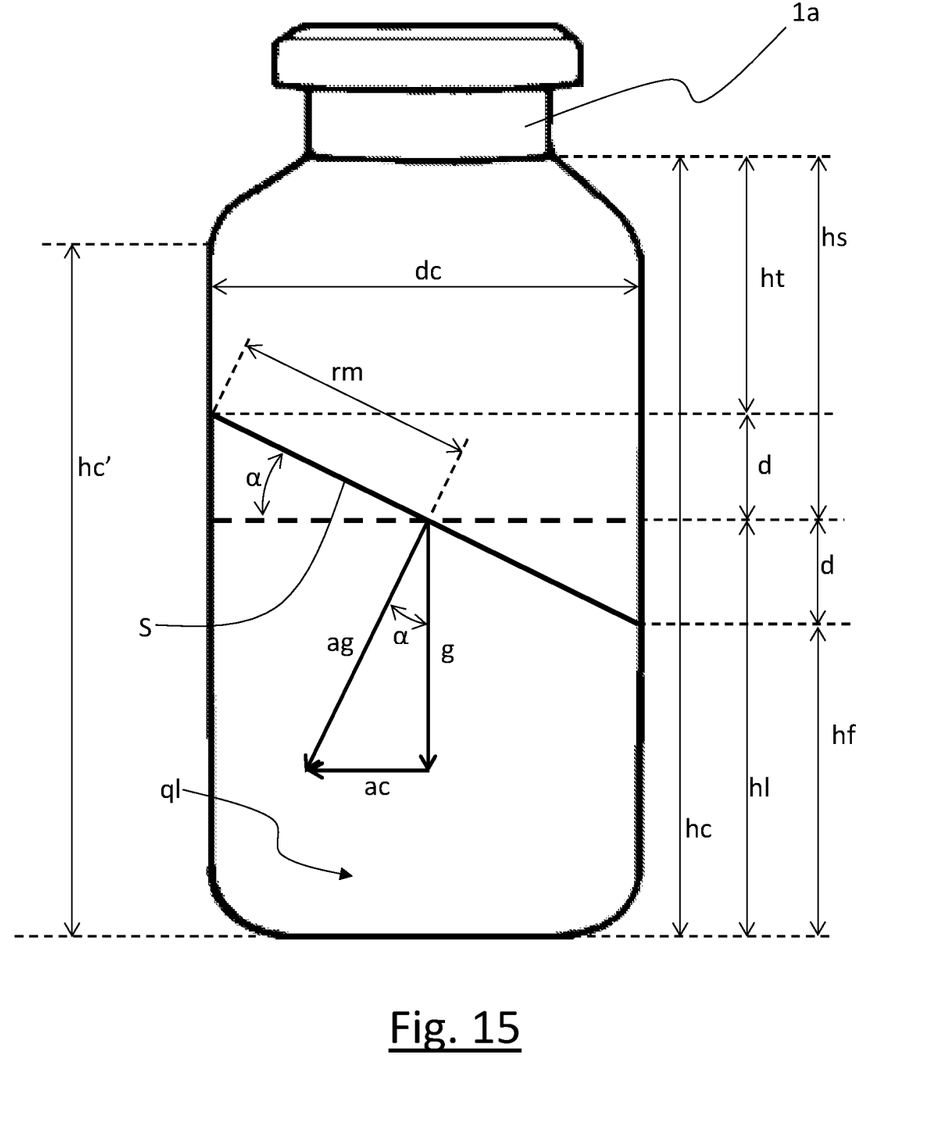
FIG. 15 is a schematic view of a rotating container containing liquid.

Referring to FIG. 15, having established the size of the container 1 and the amount of the liquid phase 2 inserted therein, it is possible to obtain the angle taken by the contact surface S with respect to the horizontal line when the container 1 rotates at a certain speed and, as a result, the extent of the contact surface S between the liquid phase 2 and the gas phase 3.

Data:
g, gravity acceleration
r, distance of the axis A2 of the container 1 from the rotation axis A1 of the supporting element 10
v, tangential velocity of the container 1 along its trajectory around the rotation axis A1 of the supporting element 10

The apparent centrifugal acceleration ac acting on the container 1 is:

$$ac = \frac{v^2}{r}$$

The apparent gravity force ag acting on the container is the vector composition of g and ac, having modulus equal to $$ag = \sqrt{g^2 + ac^2}$$

As a result, the angle taken by the contact surface S with respect to the horizontal is:

$$\alpha = \arcsin\left(\frac{ac}{ag}\right)$$

It is now possible to calculate the extent of the contact surface S between the liquid phase 2 and the gaseous phase 3 as a function of the angle α taken by the contact surface S, the amount of liquid 2 contained in the container 1 and the size of the container 1 itself.

Data:
dc, the diameter of the container 1
hc, the height of the container 1
ql, the amount of liquid 2 in the container 1

The height hl of the liquid 2 in the container 1 at rest is:

$$hl = \frac{ql}{\left(\frac{\pi * dc^2}{4}\right)}$$

Accordingly, the height hs of the headspace in the container at rest is:

$$hs = hc - hl$$

Therefore, the distance d on the wall between the free surface of the liquid when horizontal, with the vial at rest, and when inclined, with the vial rotating, can be calculated:

$$d = \frac{dc}{2}\tan(\alpha)$$

Thus, the smallest distance hf on the wall between the liquid 1 and the bottom of the container 1 is:

$$hf = hl - d$$

Similarly, the smallest distance ht on the wall between the liquid 2 and the cap 1*a* of the container is:

$$ht = hc - (hl + d)$$

In order to calculate the surface Spl of the liquid's free-surface (i.e. the area of the contact surface) when the container 1 is rotating, the greater radius rm of the ellipse formed by the contact surface S must be calculated:

$$rm = \sqrt{\left(\left(\frac{dc}{2}\right)^2 + d^2\right)}$$

Thus, when the container 1 is rotating, the free surface Spl of the liquid 2 is:

$$Spl = \pi * \frac{df}{2} * rm$$

These equations allow the rotation speed rm to be optimized, according to the amount of liquid 2 contained in the container 1 and the type of container 1, so as to maximize the size of the contact surface S, that is to say to calculate the greatest angle α that allows the liquid 2 not to touch the cap 1a or the bottom of the container 1.

Considering the containers 1 spaced 46.5 mm from the rotation axis A1 of the supporting element 10, the following table lists some examples of calculation of the highest rotation speed rm, and the respective size of the contact surface S:

|  | Amount of liquid | Rotation speed | Angle the liquid takes | Liquid-gas surface |
|---|---|---|---|---|
| 20 ml vial | 5 ml | 2.9 revolutions per second | 57.6° | 585.7 mm$^2$ |
| 20 ml vial | 10 ml | 3.8 revolutions per second | 69.7° | 905.1 mm$^2$ |
| 10 ml vial | 5 ml | 2.7 revolutions per second | 53.8° | 531.3 mm$^2$ |

It should be noted that for convenience's sake, in the figures, the container height hc has been considered up to the cap 1a. When using a container with a "bottleneck" top, if the contact between the liquid 2 and the cap of the container 1 is to be prevented, the height hc of the container can be considered as the distance hc' between the bottom of the container and the lower portion of the "bottleneck". It can be observed that by keeping the liquid 2 at a height lower than the lower portion of the bottleneck, the contact between the liquid 2 and the cap 1a of the container 1 is prevented.

In general, thanks to the tilt of the contact surface S, the latter is larger with respect to its size in the rest state, thereby favoring the exchange between the liquid 2 and the gas 4, and in particular the transition of the sample 3 from the liquid 2 to the gas 4.

The angular velocity of the supporting element 10 is preferably higher than 1 revolution per second, more preferably higher than 2 revolutions per second, even more preferably it is calculated according to the above-described equations in order to maximize the liquid-gas contact surface.

According to an aspect, the supporting element 10 is kept rotating for at least 1 second. Preferably, moreover, during its rotation, the supporting element 10 rotates for at least one complete revolution, i.e. at least 360°, more preferably for at least two complete revolutions, i.e. at least 720°, even more preferably for at least five complete revolutions, i.e. at least 1800°.

Figure 10:
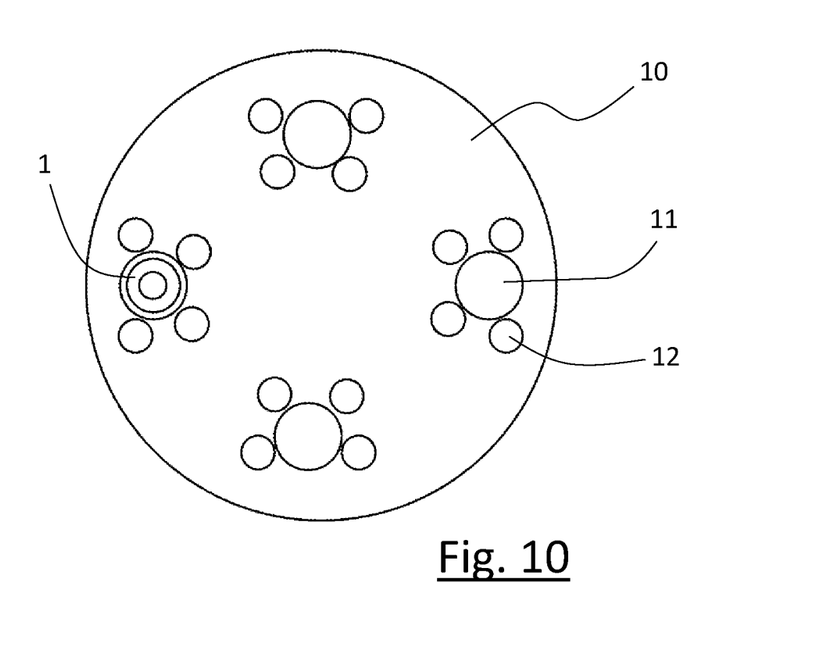
FIG. 10 is a schematic view similar to FIG. 8, wherein the supporting element has been stopped after a further rotation.
Figure 11:
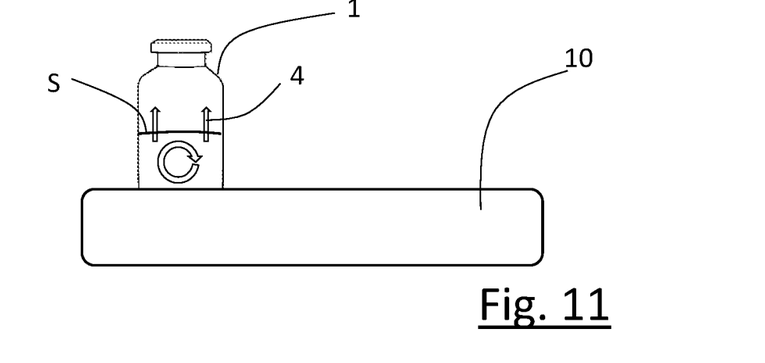
FIG. 11 is a schematic front view of FIG. 10, wherein part of the elements has been omitted.

According to a preferred aspect, the rotation is not continuous but is preferably stopped (or slowed down), as schematically shown in FIGS. 10 and 11, for a time period preferably exceeding 0.5 seconds, more preferably ranging between 0.5 and 10 seconds. "Slowed down" means an angular velocity much lower (at least 5 times, preferably at least 10 times lower) than the previous rotation step.

Moreover, according to a particular aspect, at least one rotation cycle (i.e. one rotation step between two slowdowns or stops) causes the supporting element 10 to rotate by at least 360°, or at least 720°, or at least 1800°.

Figure 8:
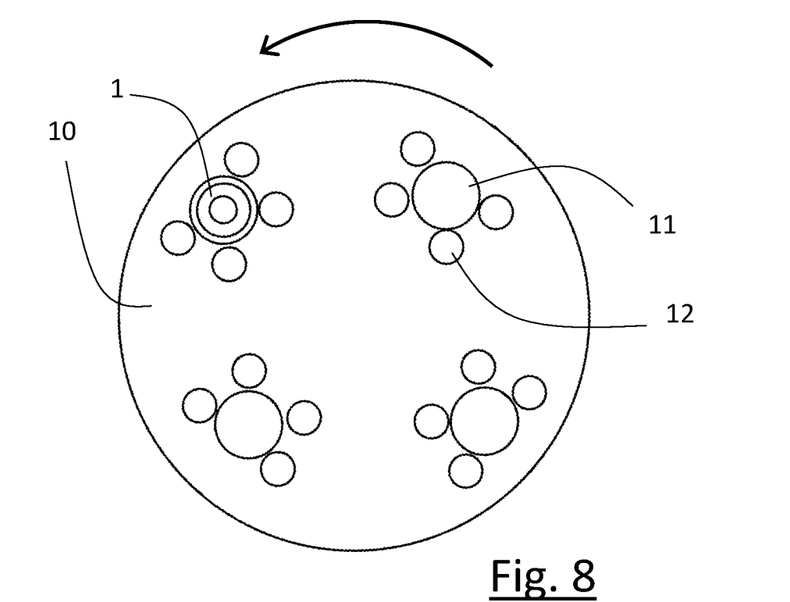
FIG. 8 is a plan view similar to FIG. 6, wherein the supporting element has been further rotated.
Figure 9:
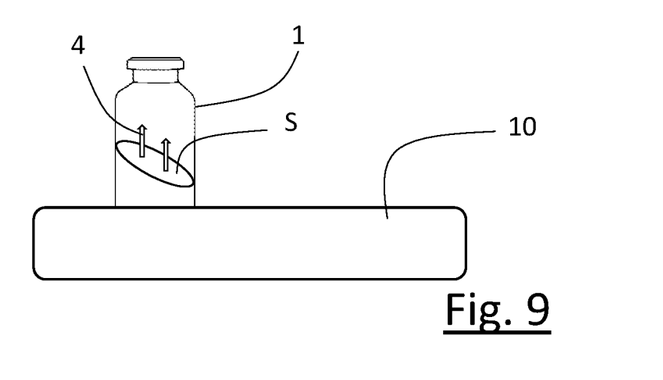
FIG. 9 is a schematic front view of FIG. 8, wherein part of the elements has been omitted.
Figure 12:
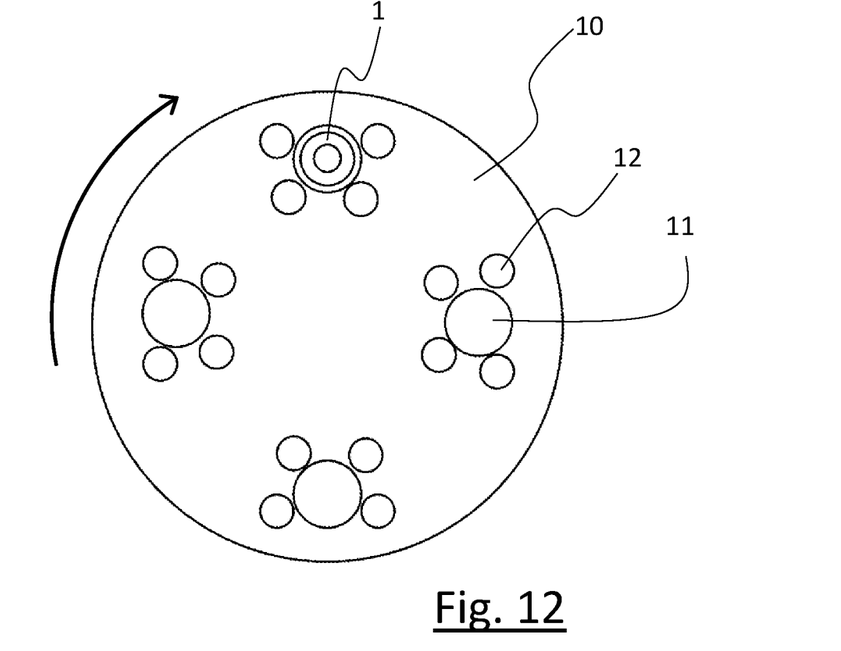
FIG. 12 is a schematic view similar to FIG. 10, wherein the supporting element has been rotated in the direction opposite to the rotation direction of FIGS. 6-9.
Figure 13:
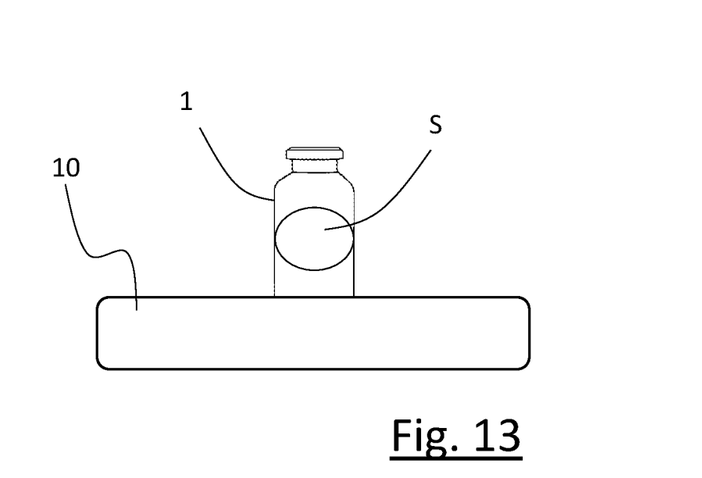
FIG. 13 is a schematic front view of FIG. 10, wherein part of the elements has been omitted.

In the embodiment shown, the supporting element 10 changes its rotation direction at least once. In other words, the supporting element performs a first rotation step in a direction (e.g. clockwise, as shown in FIG. 8), and then performs a second rotation step in the direction opposite to the previous direction (e.g. counterclockwise, as shown in FIG. 12), typically by alternating them with the aforementioned stopping or slowing down steps.

The rotation speed of the first and second steps is preferably the same, although embodiments in which the rotation speed varies between the first and second rotation steps are not excluded.

In the embodiment shown in figures, a single change in the direction (i.e. the way) of rotation of the supporting element 10 is shown. Actually, the rotation direction is preferably changed several times, i.e. the rotation direction preferably varies at least twice, more preferably at least three times, even more preferably at least five times.

As described above, the supporting element is arranged in a heated housing 100, typically an oven or incubator, so that the temperature inside the housing is between 20 and 300° C. at least during the rotation of the supporting element.

Figure 14:
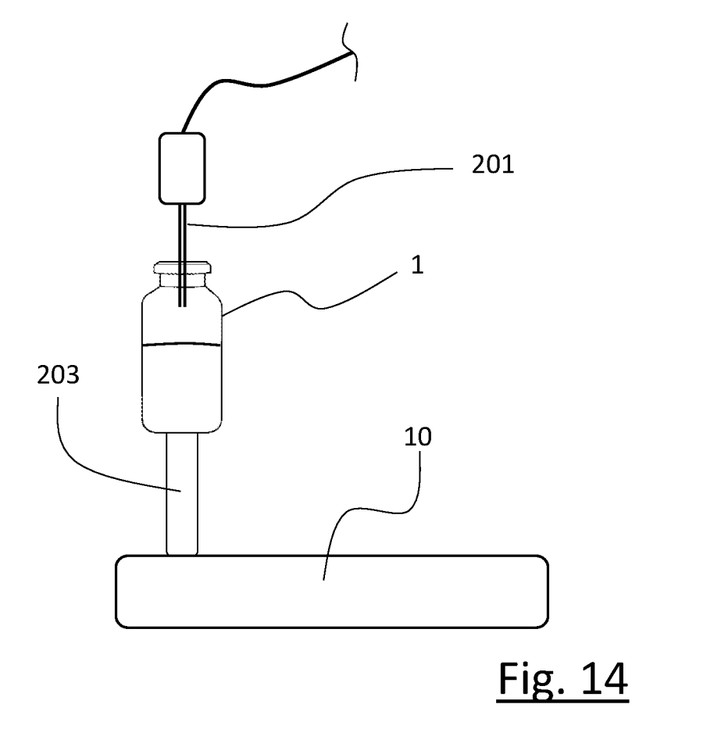
FIG. 14 is a schematic view of the collection of a sample from the headspace of a container at the end of the rotation of FIGS. 5-13.

At the end of the rotation of the supporting element 10, a sample is collected from the headspace of the container 1 in a known manner, for example by means of a needle or a similar sampling element 201, as shown in FIG. 14. For example, a lift 203 can be used so as to move the container 1 towards the sampling element 201.

The collected sample is typically sent to a gas chromatograph or similar analysis instrument. As discussed above, thanks to the equilibrium reached by shaking the container 1 (and preferably also by heating it), at least part of the substance to be analyzed has been volatilized (i.e. has become gaseous) and has been transferred to the headspace.

Typically, the device 200 is further equipped with a control unit 202 configured to control the operations of the device 200, including the rotation of the supporting element.

The invention claimed is:

1. Process for sampling a headspace, comprising the steps of:
   (i) preparing a container containing a liquid, a gas and a substance to be analyzed initially at least partially contained in the liquid, wherein the liquid has a contact surface contacting the gas and the container has a longitudinal axis;
   (ii) constraining said container to a supporting element rotatable only around a single central rotation axis such that said container revolves only about said single central rotation axis, said central rotation axis spaced a distance from said longitudinal axis;
   (iii) revolving said container only about said single central rotation axis by rotating said supporting element only about said central rotation axis at an angular velocity such as to impart a tangential velocity upon said container along its trajectory around said central rotation axis, which tangential velocity causes said contact surface to tilt by an angle (α) of at least 20 degrees with respect to a plane parallel to a bearing surface of the supporting element;
   (iv) stopping the rotation of said supporting element; and
   (v) collecting a sample of the substance to be analyzed, from the gas,
   wherein the longitudinal axis is substantially parallel to the central rotation axis,
   wherein in said step (iii), the supporting element is rotated for at least 1 second; and
   wherein in said step (iii), the angular velocity of said supporting element exceeds 1 revolution per second.

2. Process according to claim 1, wherein, in said step (iii), said supporting element performs at least one complete revolution.

3. Process according to claim 1, wherein, in said step (iii), the rotation is stopped or slowed down and subsequently restarted at least once.

4. Process according to claim 1, wherein, in said step (iii), the contact surface is tilted by at least 30 degrees, or by an angle (α) maximizing the size of the contact surface without allowing contact between the liquid and a cap of the container.

5. Process according to claim 1, wherein said distance is greater than 2 cm.

6. Process according to claim 1, wherein said central rotation axis is substantially vertical.

7. Device for sampling a headspace, comprising a supporting element rotatable around a central rotation axis, provided with at least one seat to accommodate a container so that, in use, said rotation axis does not cross said container, and configured to carry out the process according to claim 1.

8. Process according to claim 1, wherein said constraining said container to a supporting element comprises disposing said container within a plurality of protrusions arranged around said container, said protrusions having a height greater than a height of said container.

9. Process according to claim 1, wherein said revolving said container only about said single central rotation axis by rotating said supporting element only about said central rotation axis comprises rotating said supporting element about said central rotation axis for at least 2 complete revolutions and wherein in said step (iii), an angular velocity of said supporting element exceeds 3 revolution per second.

10. Process according to claim 1, wherein said revolving said container only about said single central rotation axis by rotating said supporting element only about said central rotation axis comprises rotating said supporting element about said central rotation axis for at least 5 complete revolutions and wherein said rotating said supporting element about said central rotation axis comprises a non-continuous rotation cycle including stopping or slowing down said rotation of said supporting element at least once.

11. Process according to claim 10, wherein said rotating said supporting element about said central rotation axis comprises said non-continuous rotation cycle including said stopping at least once, each said stop lasting for a time period between 5 and 10 seconds.

12. Process according to claim 11, wherein an angular velocity of said supporting element exceeds 3 revolutions per second while rotating during said non-continuous rotation cycle.

13. Process according to claim 1, wherein, in step (iii), a direction of rotation is reversed from a first rotation direction to a second, opposite rotation direction and wherein a rotation speed in the first rotation direction varies from a rotation speed in the second rotation direction.

14. Process for sampling a headspace, comprising the steps of:
(i) preparing a container containing a liquid, a gas and a substance to be analyzed initially at least partially contained in the liquid, wherein the liquid has a contact surface contacting the gas;
(ii) constraining said container to a supporting element rotatable only around a single central rotation axis such that said container revolves only about said single central rotation axis;
(iii) revolving said container only about said single central rotation axis by rotating said supporting element only about said central rotation axis at an angular velocity such as to impart a tangential velocity upon said container along its trajectory around said central rotation axis, which tangential velocity causes said contact surface to tilt by an angle (α) of at least 20 degrees with respect to a plane parallel to a bearing surface of the supporting element;
(iv) stopping the rotation of said supporting element; and
(v) collecting a sample of the substance to be analyzed, from the gas,
wherein the container has a longitudinal axis substantially parallel to and spaced a distance from, the central rotation axis;
wherein in said step (iii), the supporting element is rotated for at least 1 second; and
wherein in said step (iii), the angular velocity of said supporting element exceeds 1 revolution per second and a direction of rotation is reversed at least once between first and second rotation steps and a rotation speed varies between the first and second rotation steps; and
wherein said step (iii) takes place with said supporting element disposed inside a heated housing and, at least in said step (iii), a temperature inside said heated housing is between 20 and 300° C.

15. Process according to claim 14, wherein said angular velocity exceeds 2 revolution per second and said revolving said container only about said single central rotation axis by rotating said supporting element only about said central rotation axis comprises rotating said supporting element about said central rotation axis for at least 5 complete revolutions.

16. Process according to claim 15, wherein said rotating said supporting element only about said single central rotation axis comprises a non-continuous rotation cycle including stopping or slowing down said rotation of said supporting element at least once.

17. Process for sampling a headspace, comprising the steps of:
(i) preparing a container containing a liquid, a gas and a substance to be analyzed initially at least partially contained in the liquid, wherein the liquid has a contact surface contacting the gas and the container has a longitudinal axis;
(ii) constraining said container to a supporting element rotatable only around a single central rotation axis, said central rotation axis spaced a distance from said longitudinal axis;
(iii) revolving said container only about said single central rotation axis by rotating said supporting element only about said central rotation axis at an angular velocity such as to impart a tangential velocity upon said container along its trajectory around said central rotation axis, which tangential velocity causes said contact surface to tilt by an angle (α) of at least 20 degrees with respect to a plane parallel to a bearing surface of the supporting element;
(iv) stopping the rotation of said supporting element; and
(v) collecting a sample of the substance to be analyzed, from the gas,
wherein the longitudinal axis is substantially parallel to the central rotation axis,
wherein, in step (iii), a direction of rotation is reversed at least once between first and second rotation steps and a rotation speed varies between the first and second rotation steps.

* * * * *